(12) United States Patent
Seo et al.

(10) Patent No.: US 12,503,039 B2
(45) Date of Patent: Dec. 23, 2025

(54) CONTROL DEVICE

(71) Applicant: TOYOTA JIDOSHA KABUSHIKI KAISHA, Toyota (JP)

(72) Inventors: Naohiro Seo, Shizuoka-ken (JP); Toshiya Hashimoto, Miyoshi (JP); Masato Maemura, Numazu (JP); Ryosuke Ikemura, Susono (JP); Shogo Tsuge, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 149 days.

(21) Appl. No.: 18/541,436

(22) Filed: Dec. 15, 2023

(65) Prior Publication Data
US 2024/0308414 A1   Sep. 19, 2024

(30) Foreign Application Priority Data
Mar. 13, 2023   (JP) .................. 2023-039046

(51) Int. Cl.
*B60Q 1/12*   (2006.01)
(52) U.S. Cl.
CPC ............ *B60Q 1/12* (2013.01); *B60Q 2300/12* (2013.01)

(58) Field of Classification Search
CPC ....... B60Q 1/12; B60Q 2300/12; Y02T 10/70; Y02T 10/7072; Y02T 90/14; B60L 53/12; B60L 53/124; B60L 53/126; B60L 53/38
See application file for complete search history.

(56) References Cited

U.S. PATENT DOCUMENTS

2019/0241086 A1*   8/2019   Bojahr .................. H04W 4/021

FOREIGN PATENT DOCUMENTS

| JP | 2014079077 A | * | 5/2014 |
| JP | 2015-228047 A |   | 12/2015 |

OTHER PUBLICATIONS

English machine translation of JP2014-079077A. (Year: 2014).*
Machine translation into English of foreign JP 2014079077 A. (Year: 2014).*

* cited by examiner

*Primary Examiner* — Michael C Zarroli
(74) *Attorney, Agent, or Firm* — SoraIP, Inc.

(57) ABSTRACT

A vehicle electronic control unit (ECU) determines whether the power transmission efficiency is decreasing due to the vehicle moving laterally from the power supply lane at night, and if the power transmission efficiency is decreasing, the ECU activates an adaptive front-lighting system (AFS), which can automatically change the range of light emitted in a traveling direction of the vehicle in response to a steering operation.

9 Claims, 8 Drawing Sheets

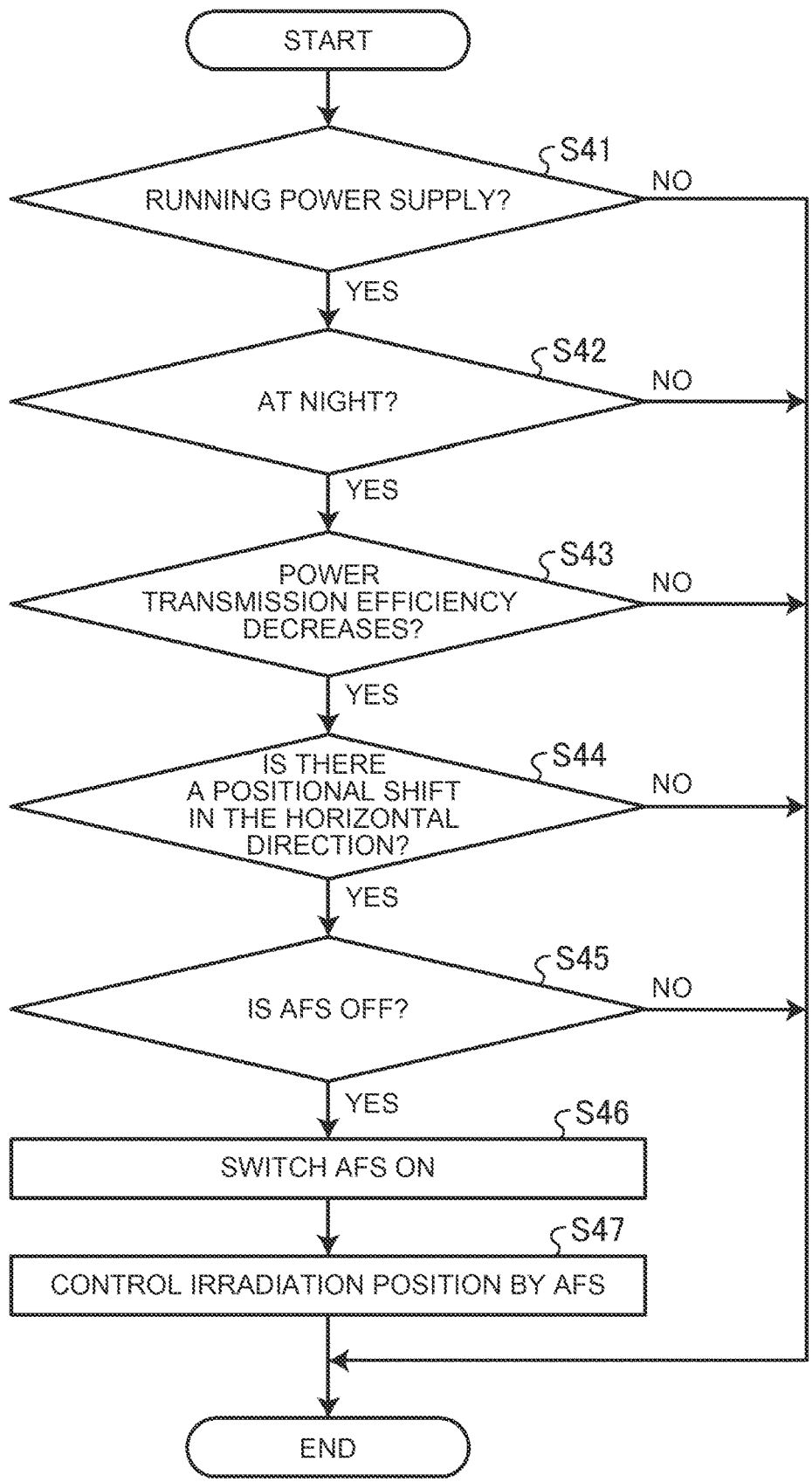

CONTROL DEVICE

CROSS-REFERENCE TO RELATED APPLICATION

This application claims priority to Japanese Patent Application No. 2023-039046 filed on Mar. 13, 2023, incorporated herein by reference in its entirety.

BACKGROUND

1. Technical Field

The present disclosure relates to a control device.

2. Description of Related Art

Japanese Unexamined Patent Application Publication No. 2015-228047 (JP 2015-228047 A) discloses a technique of improving a charging efficiency when a vehicle receives power supplied in a non-contact manner while traveling in a power feeding section of a power feeding lane. In this technique, a travel support server extracts a travel position and a vehicle speed of the vehicle included in vehicle data extracted from a storage unit from a plurality of pieces of vehicle data on condition that the charging efficiency is equal to or more than a prescribed value, and notifies the vehicle of the extracted travel position and vehicle speed as travel support information.

SUMMARY

However, JP 2015-228047 A does not assume a case where the power transmission efficiency is reduced when the vehicle is displaced from the power feeding lane at night, and therefore there is room for improvement.

The present disclosure has been made in view of the above, and has an object to provide a control device capable of improving a power transmission efficiency even when the power transmission efficiency is reduced when a vehicle is displaced from a power feeding lane at night.

In order to address the above issue and achieve the above object, an aspect of the present disclosure provides a control device that controls a vehicle capable of receiving power from a primary coil of a supply device using a secondary coil in a non-contact manner while traveling in a power feeding lane, the control device including a processor, in which the processor is configured to: determine whether a power transmission efficiency is reduced when the vehicle is displaced laterally from the power feeding lane at night; and activate an irradiation unit capable of automatically changing a range of light emitted in a traveling direction of the vehicle in response to a steering operation when the power transmission efficiency is reduced.

According to the present disclosure, it is possible to improve a power transmission efficiency even when the power transmission efficiency is reduced when a vehicle is displaced from a power feeding lane at night.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a flowchart outlining some of the processes executed by the vehicle 3 in perform power transfer A150.

DETAILED DESCRIPTION OF EMBODIMENTS

Hereinafter, a control device in an embodiment of the present disclosure will be specifically described. The present disclosure is not limited to the embodiments described below.

Configuration of Wireless Power Transfer System

Figure 1:
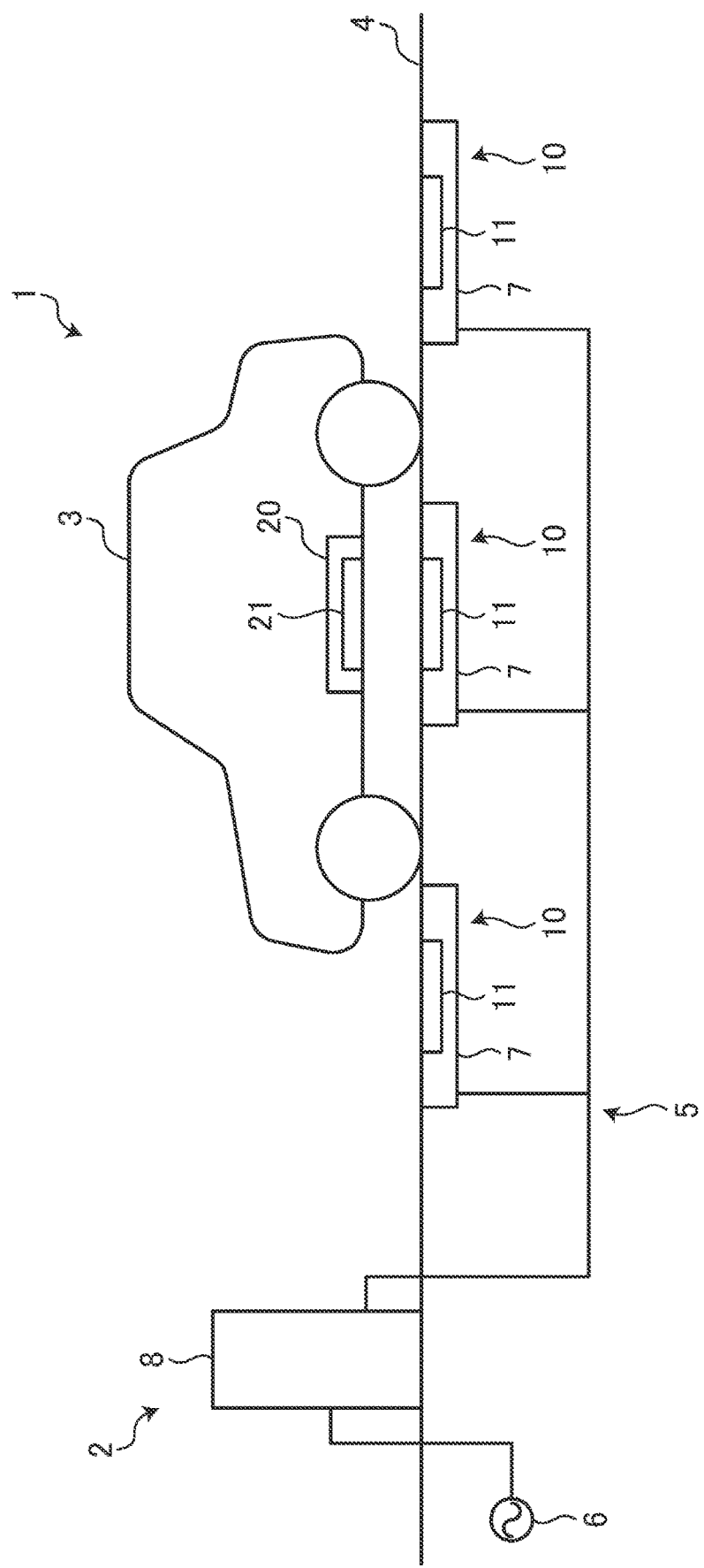
FIG. 1 is a schematic diagram showing a wireless power transfer system in an embodiment.

FIG. 1 is a schematic diagram showing a wireless power transfer system in an embodiment. The Wireless Power Transfer System 1 includes supply equipment 2 and a vehicle 3. The supply equipment 2 is equipment that supplies electric power to the running vehicle 3 in a non-contact manner. The vehicle 3 is an electrified vehicle that can be charged with electric power supplied from an external power source, and is, for example, a large vehicle such as a battery electric vehicle (BEV) or a plug-in hybrid electric vehicle (PHEV) such as a bus or a truck.

This wireless power transfer system 1 performs wireless power transmission from a supply equipment 2 to a vehicle 3 by magnetic field resonance coupling (magnetic field resonance). The wireless power transfer system 1 transmits power from a supply equipment 2 to a vehicle 3 running on a road 4 in a non-contact manner. That is, the wireless power transfer system 1 transmits power using a magnetic resonance method, and realizes power supply to the vehicle 3 while the vehicle is running using magnetic resonance coupling (magnetic field resonance). The wireless power transfer system 1 can be described as a dynamic wireless power transfer (D-WPT) system or a magnetic field dynamic wireless power transfer (MF-D-WPT) system.

Configuration of Supply Device

The supply equipment 2 includes a supply device 5 and an AC power supply 6 that supplies power to the supply device 5. The supply device 5 transmits power supplied from the AC power supply 6 to the vehicle 3 in a non-contact manner. The AC power supply 6 is, for example, a commercial power supply. This supply device 5 includes a power transmission device 10 having a primary coil 11.

The supply device 5 includes a segment 7 including the primary coil 11 and a management device 8 that manages the segment 7. Segment 7 is embedded within the lane of road 4. The management device 8 is installed on the side of the road 4. Segment 7 is electrically connected to management device 8. The management device 8 is electrically connected to the AC power supply 6 and supplies power from the AC power supply 6 to the segments 7. Segment 7 is electrically connected to AC power supply 6 via management device 8. A plurality of segments 7 can be arranged along the lanes of the road 4. For example, as shown in FIG. 1, the supply device 5 includes three segments 7 arranged side by side along the lane in the road 4 and one management device 8 to which the three segments 7 are connected. The segment 7 has a function of transmitting electric power from the supply device 5 to the vehicle 3 in a contactless manner. The management device 8 has a function of controlling wireless power transmission in the segment 7.

Vehicle Configuration

Vehicle 3 includes power reception device 20 having secondary coil 21. The power reception device 20 is provided at the bottom of the vehicle 3. When the vehicle 3 travels on the road 4 on which the primary coil 11 is installed, the primary coil 11 on the ground side and the secondary coil 21 on the vehicle side face each other in the vertical direction. The wireless power transfer system 1 transmits power from the primary coil 11 of the power transmission device 10 to the secondary coil 21 of the power reception device 20 in a non-contact manner while the vehicle 3 is traveling on the road 4.

In this description, traveling means a state in which the vehicle 3 is located on the road 4 for traveling. While traveling, a state in which the vehicle 3 is temporarily stopped on the road 4 is also included. For example, running includes a state in which the vehicle 3 is stopped on the road 4 due to waiting for a signal or the like. On the other hand, even if the vehicle 3 is located on the road 4, for example, if the vehicle 3 is parked or stopped, it is not included in the running state.

In addition, in this explanation, the lane in which the primary coil 11 (segment 7) is embedded is referred to as the D-WPT lane, which is a part of the road 4 where wireless power transmission by the supply device 5 is possible. This is sometimes referred to as a D-WPT charging site. In the D-WPT lane and the D-WPT charging site, a plurality of primary coils 11 (plurality of segments 7) are arranged in the traveling direction of the vehicle 3 over a predetermined section of the road 4.

Overall Configuration of Wireless Power Transfer System

Figure 2:
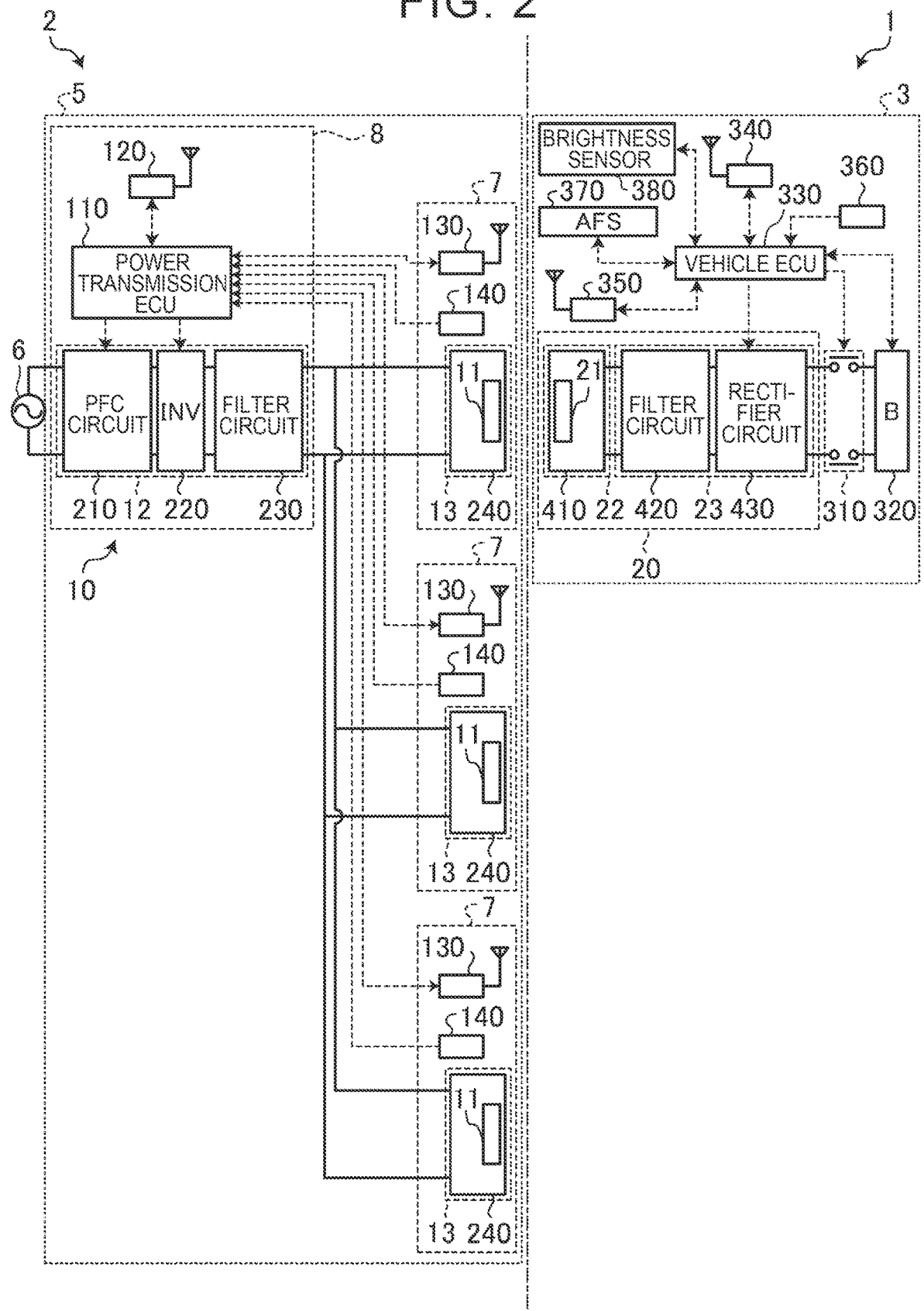
FIG. 2 is a diagram showing the overall configuration of the wireless power transfer system.

FIG. 2 is a diagram showing the overall configuration of the wireless power transfer system. In the following, the supply equipment 2 and the vehicle 3 will be explained in this order.

Functional Configuration of Supply Device

In the supply equipment 2, a supply device 5 and an AC power supply 6 are electrically connected. In the supply device 5, the segment 7 and the management device 8 are electrically connected. The supply device 5 includes a configuration provided in the management device 8 and a configuration provided in the segment 7. The supply device 5 includes a power transmission device 10, a power transmission electronic control unit (ECU) 110, a first communication device 120, a second communication device 130, and a foreign object detection device 140.

Power transmission device 10 includes an electric circuit connected to AC power supply 6. The power transmission device 10 includes a Power Factor Collection (PFC) circuit 210, an inverter (INV) 220, a filter circuit 230, and a power transmission side resonance circuit 240.

PFC circuit 210 improves the power factor of AC power input from AC power supply 6, converts the AC power into DC power, and outputs the DC power to inverter 220. This PFC circuit 210 is configured including an AC/DC converter. PFC circuit 210 is electrically connected to AC power supply 6.

Inverter 220 converts DC power input from PFC circuit 210 into AC power. Each switching element of the inverter 220 is configured with an Insulated Gate Bipolar Transistor (IGBT), a Metal-Oxide-Semiconductor Field Effect Transistor (MOSFET), etc., and performs a switching operation in response to a control signal from the power transmission ECU 110. For example, the driving frequency of inverter 220 is 85 kHz. Inverter 220 outputs the converted AC power to filter circuit 230.

The filter circuit 230 removes noise contained in the alternating current input from the inverter 220 and supplies the noise-free alternating current power to the power transmission side resonance circuit 240. The filter circuit 230 is an LC filter that combines a coil and a capacitor. For example, the filter circuit 230 is configured by a T-type filter in which two coils and one capacitor are arranged in a T-shape. PFC circuit 210, inverter 220 and filter circuit 230 constitute power conversion unit 12 of power transmission device 10.

The power transmission side resonance circuit 240 is a power transmission unit that transmits the AC power supplied from the filter circuit 230 to the power reception device 20 in a non-contact manner. When AC power is supplied from the filter circuit 230 to the power transmission side resonance circuit 240, current flows through the primary coil 11, and a magnetic field for power transmission is generated.

The power transmission side resonance circuit 240 includes a primary coil 11 and a resonance capacitor. The primary coil 11 is a power transmission coil. This resonance capacitor is connected in series to one end of the primary coil 11 and adjusts the resonance frequency of the power transmission side resonance circuit. This resonant frequency is between 10 kHz and 100 GHz, preferably 85 kHz. For example, the power transmission device 10 is configured such that the resonance frequency of the power transmission side resonance circuit 240 and the drive frequency of the inverter 220 match. The power transmission side resonance circuit 240 constitutes the primary device 13 of the power transmission device 10.

The power transmission device 10 includes a power conversion unit 12 and a primary device 13. Power conversion unit 12 includes a PFC circuit 210, an inverter 220, and a filter circuit 230. The primary device 13 includes a power transmission side resonance circuit 240. The power transmission device 10 has a configuration in which the power conversion unit 12 is provided in the management device 8 and the primary device 13 is provided in the segment 7.

In the supply device 5, the power conversion unit 12 of the power transmission device 10, the power transmission ECU 110, and the first communication device 120 are provided in the management device 8, and the primary device 13 of the power transmission device 10, the second communication device 130, and a foreign object detection device 140 are provided in the segment 7.

Power transmission ECU 110 is an electronic control device that controls supply device 5. Power transmission ECU 110 includes a processor and a memory. The processor consists of a Central Processing Unit (CPU), Digital Signal Processor (DSP), Field-Programmable Gate Array (FPGA), etc. Memory is a main storage device, and consists of Random Access Memory (RAM), Read Only Memory (ROM), etc. The power transmission ECU 110 loads a program stored in a storage unit into a work area of a memory (main storage device) and executes it, and controls each component through the execution of the program to perform functions that meet a predetermined purpose. Realize. The storage unit includes a recording medium such as an Erasable Programmable ROM (EPROM), a Hard Disk Drive (HDD), and a removable medium. Examples of removable media include disc recording media such as Universal Serial Bus (USB) memory, Compact Disc (CD), Digital Versatile Disc (DVD), and BD (Blu-ray (registered trademark) Disc). The storage unit can store an Operating System (OS), various programs, various tables, various databases, and the like. Signals from various sensors are input to power transmission ECU 110. A signal from foreign object detection device 140 is input to power transmission ECU 110. Power transmission ECU 110 then executes various controls based on signals input from various sensors.

For example, the power transmission ECU 110 executes power control to adjust power for power transmission. In power control, power transmission ECU 110 controls power transmission device 10. Power transmission ECU 110 outputs a control signal to power conversion unit 12 in order to control the power supplied from power conversion unit 12 to primary device 13. Power transmission ECU 110 controls switching elements included in PFC circuit 210 to adjust power for transmission, and controls switching elements included in inverter 220 to adjust power for transmission.

Further, power transmission ECU 110 executes communication control to control communication with vehicle 3. In communication control, power transmission ECU 110 controls first communication device 120 and second communication device 130.

The power transmission ECU 110 acquires power transmission device information regarding the power transmission device 10 of the supply device 5, power reception device information regarding one or more power reception devices 20 provided in the vehicle 3, and state information regarding the state of the battery 320 of the vehicle 3 Power transmission ECU 110 then determines the amount of power to be supplied to vehicle 3 based on the positional relationship between power transmission device 10 and power reception device 20 based on the power transmission device information, power reception device information, and state information. Specifically, power transmission ECU 110 determines the first amount of power based on the type of power transmission device 10, the type of power reception device 20, and the voltage of battery 320, and A second amount of power is determined according to the positional relationship between the power transmission device 10 and the power reception device 20 based on the arrangement position of the power transmission device 10 and the power reception device 20, and the smaller of the first amount of power and the second amount of power is determined as the amount of electricity to be supplied from the power transmission device 10. Furthermore, the power transmission ECU 110 calculates the maximum value of power that can be supplied to the vehicle 3 based on the charging rate of the battery 320 of the vehicle 3 and the temperature of the battery 320, and adjusts the amount of power to be smaller so as not to exceed this maximum value, and causes the power transmission device 10 to supply power to the vehicle 3. Note that in the embodiment, the power transmission ECU 110 functions as a processor.

The first communication device 120 is a ground-side communication device that performs wide area wireless communication. The first communication device 120 performs wireless communication with the vehicle 3 that is before approaching the WPT lane, out of the vehicles 3 traveling on the road 4. The state before approaching the WPT lane means that the vehicle 3 is in a position where short-range wireless communication cannot be performed with the supply device 5.

Wide area wireless communication is communication with a communication distance of 10 meters to 10 kilometers. Wide area wireless communication has a longer communication distance than narrow area wireless communication. As the wide area wireless communication, various types of wireless communication having a long communication distance can be used. For example, communication conforming to communication standards such as 3GPP (registered trademark), 4G, LTE, 5G, and WiMAX established by IEEE is used for wide area wireless communication. In the wireless power transfer system 1, vehicle information linked to vehicle identification information (vehicle ID) is transmitted from the vehicle 3 to the supply device 5 using wide area wireless communication.

The second communication device 130 is a ground-side communication device that performs short-range wireless communication. The second communication device 130 performs wireless communication with a vehicle 3 that is approaching or entering the WPT lane among the vehicles 3 traveling on the road 4. A state in which the vehicle 3 is close to the WPT lane means that the vehicle 3 is in a position where short-range wireless communication can be performed with the supply device 5.

Short-range wireless communication is communication with a communication distance of less than 10 meters. Short-range wireless communication is communication that has a shorter communication distance than wide-area wireless communication. As the short-range wireless communication, various short-range wireless communications with short communication distances can be used. For example, communication conforming to any communication standard established by IEEE, ISO, IEC, etc. is used for short-range wireless communication. As an example, Wi-Fi (registered trademark), Bluetooth (registered trademark), ZigBee (registered trademark), etc. are used for short-range wireless communication. Alternatively, as a technology for performing short range wireless communication, Radio Frequency Identification (RFID), Dedicated Short Range Communication (DSRC), etc. may be used. In the wireless power transfer system 1, vehicle identification information and the like are transmitted from the vehicle 3 to the supply device 5 using short-range wireless communication.

The foreign object detection device 140 detects metal foreign objects, living organisms, etc. present above the primary coil 11. The foreign object detection device 140 is composed of, for example, a sensor coil and an imaging device installed on the ground. The foreign object detection device 140 is used to perform Foreign Object Detection (FOD) and Living Object Protection (LOP) in the wireless power transfer system 1.

In the supply device 5, the configuration of the power transmission device 10 is divided into segments 7 and management device 8, and three segments 7 are connected to one management device 8. The power transmission device 10 is configured such that one inverter supplies power to three power transmission side resonance circuits 240. Further, in the supply device 5, signals from each segment 7 are input to the management device 8. Signals from second communication device 130 and foreign object detection device 140 provided in the first segment are input to power transmission ECU 110. Similarly, signals from second communication device 130 and foreign object detection device 140 provided in the second segment are input to power transmission ECU 110. Signals from second communication device 130 and foreign object detection device 140 provided in the third segment are input to power transmission ECU 110. Power transmission ECU 110 can grasp the state of each segment 7 based on the signals input from each segment 7.

Functional Configuration of Vehicle

Next, the vehicle 3 will be explained. The vehicle 3 includes a power reception device 20, a charging relay 310, a battery 320, a vehicle ECU 330, a third communication device 340, a fourth communication device 350, a Global Positioning System (GPS) receiver 360, and a brightness control system. It includes a brightness sensor 370 and an Adaptive Front-Lighting System (AFS) 380.

The power reception device 20 supplies the power received from the power transmission device 10 to the battery 320. Power reception device 20 is electrically connected to battery 320 via charging relay 310. The power reception device 20 includes a power reception side resonance circuit 410, a filter circuit 420, and a rectifier circuit 430.

The power reception side resonance circuit 410 is a power receiving unit that receives power transmitted contactlessly from the power transmission device 10. The power reception side resonance circuit 410 is configured by a power reception side resonance circuit including a secondary coil 21 and a resonance capacitor. The secondary coil 21 is a power receiving coil that receives power transmitted from the primary coil 11 in a non-contact manner. This resonant capacitor is connected in series to one end of the secondary coil 21 and adjusts the resonant frequency of the power reception side resonance circuit. The resonant frequency of the power reception side resonance circuit 410 is determined to match the resonant frequency of the power transmission side resonance circuit 240.

The power reception side resonance circuit 410 has the same resonance frequency as the power transmission side resonance circuit 240. Therefore, when a magnetic field is generated by the power transmission side resonance circuit 240 while the power reception side resonance circuit 410 faces the power transmission side resonance circuit 240, the vibration of the magnetic field is transmitted to the power reception side resonance circuit 410. As a result, the primary coil 11 and the secondary coil 21 will be in a resonance state. When an induced current flows through the secondary coil 21 due to electromagnetic induction, an induced electromotive force is generated in the power reception side resonance circuit 410. The power reception side resonance circuit 410 receives the power transmitted in a contactless manner from the power transmission side resonance circuit 240 in this manner. The power reception side resonance circuit 410 then supplies the power received from the power transmission side resonance circuit 240 to the filter circuit 420. The power reception side resonance circuit 410 constitutes the secondary device 22 of the power reception device 20.

The filter circuit 420 removes noise contained in the alternating current input from the power reception side resonance circuit 410 and outputs the noise-removed alternating current power to the rectifier circuit 430. Filter circuit 420 is an LC filter that combines a coil and a capacitor. For example, the filter circuit 420 is configured by a T-type filter in which two coils and one capacitor are arranged in a T-shape.

The rectifier circuit 430 converts the AC power input from the filter circuit 420 into DC power and outputs the DC power to the battery 320. The rectifier circuit 430 is composed of, for example, a full-bridge circuit in which four diodes are connected as rectifier elements. A switching element is connected in parallel to each diode of the rectifier circuit 430. Each switching element of rectifier circuit 430 is configured with an IGBT, and performs a switching operation in response to a control signal from vehicle ECU 330. Rectifier circuit 430 supplies the converted DC power to battery 320. Filter circuit 420 and rectifier circuit 430 configure power conversion unit 23 of power reception device 20.

The power reception device 20 includes a secondary device 22 and a power conversion unit 23. Secondary device 22 includes a power reception side resonance circuit 410. Power conversion unit 23 includes a filter circuit 420 and a rectifier circuit 430.

Charging relay 310 is provided between rectifier circuit 430 and battery 320. The opening/closing state of charging relay 310 is controlled by vehicle ECU 330. During charging of battery 320 by power transmission device 10, charging relay 310 is controlled to be in a closed state. When charging relay 310 is closed, rectifying circuit 430 and battery 320 are electrically connected. When charging relay 310 is open, the connection between rectifier circuit 430 and battery 320 is disabled. For example, when charging relay 310 is in an open state, vehicle 3 does not request power supply.

The battery 320 is a rechargeable DC power supply, and is composed of, for example, a lithium ion battery or a nickel metal hydride battery. The battery 320 stores power supplied from the power transmission device 10 to the power reception device 20. Further, the battery 320 can supply electric power to the driving motor of the vehicle 3. The battery 320 is electrically connected to the driving motor via a power control unit (PCU). The PCU is a power conversion device that converts DC power from the battery 320 into AC power and supplies the AC power to the travel motor. Each switching element of the PCU is composed of an IGBT, and performs a switching operation in response to control signals from the vehicle ECU 330 and the like.

Vehicle ECU 330 is an electronic control device that controls vehicle 3. The vehicle ECU 330 has the same hardware configuration as the power transmission ECU 110. Signals from various sensors mounted on the vehicle 3 are input to the vehicle ECU 330. A positioning signal received by a GPS receiver 360 is also input to the vehicle ECU 330. Vehicle ECU 330 can acquire current position information of vehicle 3 from GPS receiver 360. Vehicle ECU 330 then executes various controls based on signals input from various sensors.

For example, the vehicle ECU 330 performs contactless charging control to transfer power from the primary coil 11 to the secondary coil 21 in a contactless manner and store the power received by the secondary coil 21 in the battery 320. In non-contact charging control, vehicle ECU 330 controls rectifier circuit 430, charging relay 310, third communication device 340, and fourth communication device 350. The non-contact charging control includes power control that controls charging power and communication control that controls communication with the supply device 5. In power control, vehicle ECU 330 controls switching elements included in rectifier circuit 430 to adjust the power (charging power) supplied from power reception device 20 to battery 320. In communication control, vehicle ECU 330 controls third communication device 340 and fourth communication device 350.

In addition, the vehicle ECU 330 determines whether the power transmission efficiency is reduced due to the vehicle 3 deviating laterally from the power feeding lane at night, and determines whether the power transmission efficiency is decreasing due to the vehicle 3 deviating laterally from the power feeding lane. If so, the system activates AFS 380, which can automatically change the range of light emitted in the direction of travel of the vehicle in response to steering operations. Furthermore, the vehicle ECU 330 controls the range of light emitted by the AFS 38 based on the driver's steering operation. Note that in the embodiment, the vehicle ECU 330 functions as a processor. Here, the power supply lane is the road 4 on which the primary device 13 of the supply device 5 is arranged.

The third communication device 340 is a vehicle-side communication device that performs wide area wireless communication. The third communication device 340 wirelessly communicates with the first communication device 120 of the supply device 5 before the vehicle 3 traveling on the road 4 approaches the WPT lane. Wide area wireless communication is two-way wireless communication. Communication between the first communication device 120 and the third communication device 340 is performed by high-speed wireless communication.

The fourth communication device 350 is a vehicle-side communication device that performs short-range wireless communication. The fourth communication device 350 wirelessly communicates with the second communication device 130 of the supply device 5 when the vehicle 3 approaches or enters the WPT lane. Short-range wireless communication is unidirectional wireless signaling. Unidirectional wireless signaling is Point to point signaling (P2PS). P2PS is used for notifying vehicle identification information from the vehicle 3 to the supply device 5 in each activity of pairing, alignment check, magnetic coupling check, power transfer end, and power transfer end. P2PS can also be used as a lateral alignment check. The lateral direction refers to the width direction of the lane and the width direction of the vehicle 3.

GPS receiver 360 detects the current position of vehicle 3 based on positioning information obtained from a plurality of positioning satellites. Current position information of vehicle 3 detected by GPS receiver 360 is transmitted to vehicle ECU 330.

Brightness sensor 370 detects the brightness outside vehicle 3 and outputs the detection result to vehicle ECU 330.

Under the control of the vehicle ECU 330, the AFS 380 provides an optical axis in the steering direction of the vehicle 3 and irradiates light in the traveling direction of the vehicle 3 in response to the steering operation of the vehicle 3. Further, AFS 380 automatically changes the range of light to be emitted and the size of the light area under the control of vehicle ECU 330. The AFS 380 is configured using a variable headlight system that includes headlights. Note that in the embodiment, the AFS 380 functions as an irradiation unit.

Note that the filter circuit 230 of the supply device 5 may be included in the management device 8 instead of the segment 7. That is, the filter circuit 230 may be installed on the side of the road 4. In this case, the power conversion unit 12 includes a PFC circuit 210, an inverter 220, and a filter circuit 230, and the primary device 13 includes a power transmission side resonance circuit 240.

Moreover, the filter circuit 230 may be provided for each primary coil 11 individually, or may be provided collectively for a plurality of primary coils 11.

Moreover, the filter circuit 230 is not limited to a T-type filter, and may be, for example, a band-pass filter in which a coil and a capacitor are connected in series. This is the same for the filter circuit 420 of the vehicle 3 as well.

Further, in the power transmission device 10, when the inverter 220 is connected to the plurality of primary coils 11, each primary device 13 may be provided with a switch for switching the primary coil 11 to be energized. This change-over switch may be provided in the management device 8 beside the road 4, or may be provided near the primary coil 11.

Further, the power transmission side resonance circuit 240 is not limited to a configuration in which the primary coil 11 and the resonant capacitor are connected in series. The primary coil 11 and resonant capacitor may be connected in parallel, or may be a combination of parallel and series. In short, the power transmission side resonance circuit 240 may be configured such that the resonance frequency of the power transmission side resonance circuit 240 matches the drive frequency of the inverter 220, and the connection relationship of its components is not particularly limited. The same applies to the power reception side resonance circuit 410 of the vehicle 3.

Further, the drive frequency of inverter 220 is not limited to 85 kHz, and may be a frequency around 85 kHz. In short, the driving frequency of inverter 220 may be a predetermined frequency band including 85 kHz.

Further, the power transmission device 10 may have a configuration in which a plurality of inverters 220 is connected to the output side power line (DC power line) of the PFC circuit 210.

Further, the foreign object detection device 140 may be provided not only on the ground side but also on the vehicle 3 side. For example, when the foreign object detection device on the vehicle 3 side detects a foreign object or a living body present above the primary coil 11, the power supply request can be stopped until the vehicle 3 passes the primary coil 11.

In addition, in the wireless power transfer system 1, the information transmitted from the vehicle 3 to the supply device 5 using short-range wireless communication includes, in addition to vehicle identification information, a power supply request, a power supply request value, etc. . . . The power supply request is information indicating that power transmission from the primary coil 11 is requested. The required power supply value is a required value of the amount of power transmitted from the supply device 5 to the vehicle 3. Vehicle ECU 330 can calculate the power supply request value based on the SOC of battery 320.

Furthermore, the wireless power transfer system 1 is not limited to the method of feeding power from the ground to the vehicle 3, but can also realize a method of feeding power from the vehicle 3 to the ground. In this case, the rectifier circuit 430 can be replaced with an inverter to realize rectification during power supply and power reception.

Overview of Wide Area Wireless Communication

Figure 3:
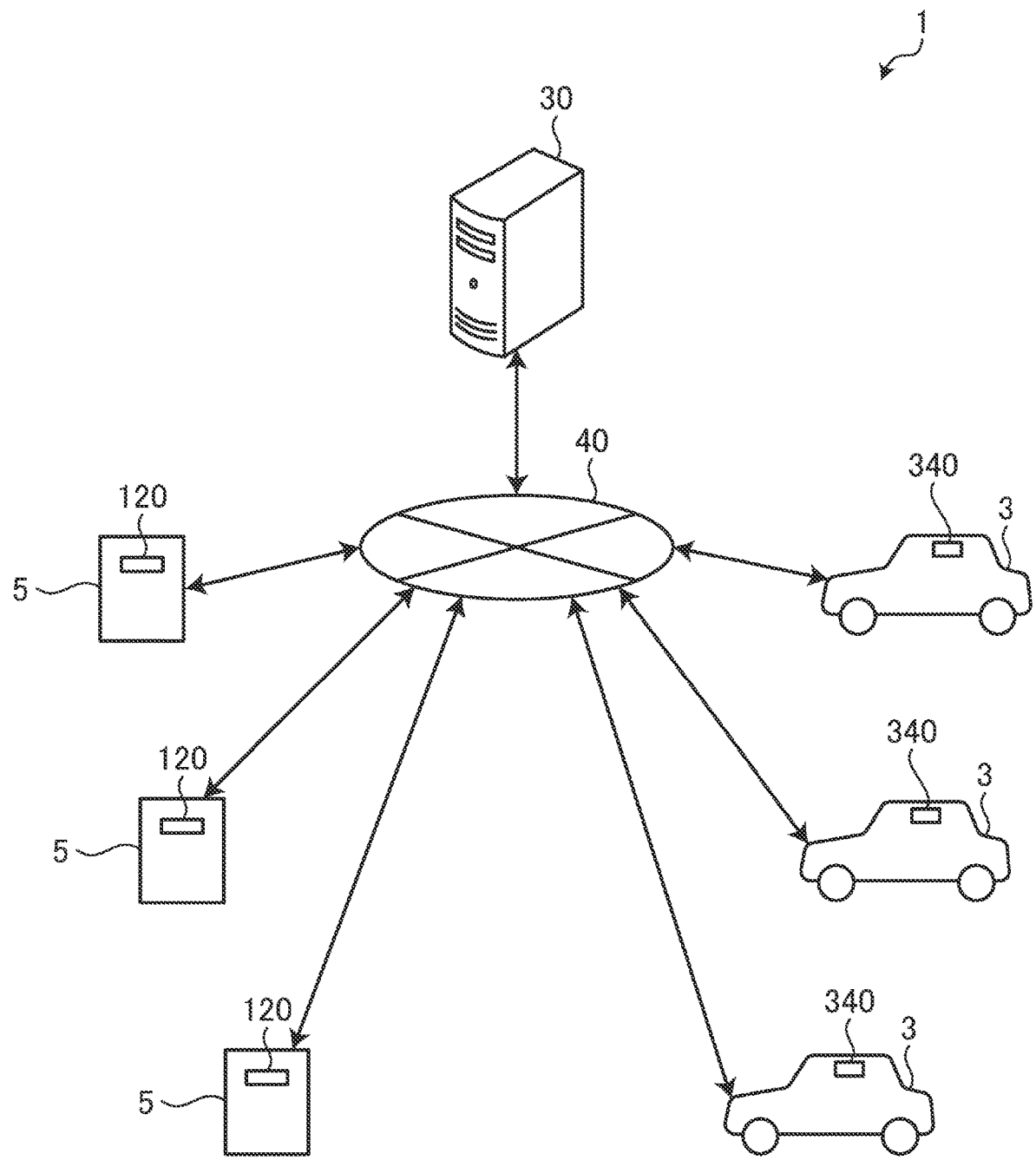
FIG. 3 is a schematic diagram for explaining wide area wireless communication in a wireless power transfer system.

FIG. 3 is a schematic diagram for explaining wide-area wireless communication in the wireless power transfer system.

In the wireless power transfer system 1, the vehicle 3 can communicate with the server 30, and the supply device 5 can communicate with the server 30. The server 30 is connected to a network 40 and can communicate with multiple vehicles 3 and multiple supply devices 5 via the network 40. The network 40 includes a Wide Area Network (WAN), which is a public communication network such as the Internet, a telephone communication network of a mobile phone, and the like.

The vehicle 3 connects to the network 40 by wide area wireless communication using the third communication device 340. Vehicle 3 transmits information to server 30 and receives information from server 30.

The supply device 5 connects to the network 40 by wide area wireless communication using the first communication device 120. The supply device 5 transmits information to the server 30 and receives information from the server 30.

Functional Configuration of Power Transmission ECU

Figure 4:
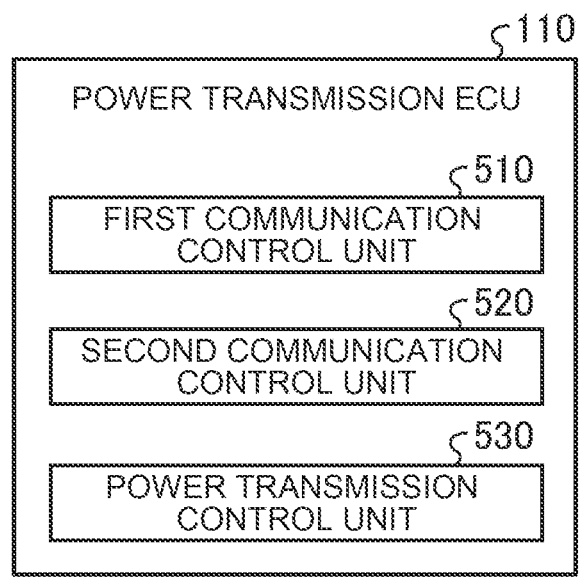
FIG. 4 is a block diagram for explaining the functional configuration of the power transmission ECU.

FIG. 4 is a block diagram showing the functional configuration of power transmission ECU 110. Power transmission ECU 110 includes a first communication control unit 510, a second communication control unit 520, and a power transmission control unit 530.

The first communication control unit 510 executes first communication control to control the first communication device 120. The first communication control is to control wide area wireless communication on the side of the supply device 5, and controls communication of the supply device 5 using the first communication device 120. That is, the first communication control controls communication of the management device 8 of the supply device 5. The first communication control controls communication between the supply device 5 and the network 40 and controls communication between the supply device 5 and the server 30 via the network 40. The first communication control unit 510 is a Supply Equipment Communication Controller (SECC).

The second communication control unit 520 executes second communication control to control the second communication device 130. The second communication control controls short-range wireless communication on the side of the supply device 5, and controls communication of the supply device 5 using the second communication device 130. That is, the second communication control controls communication of the segment 7 of the supply device 5. The second communication control controls communication between the supply device 5 and the vehicle 3 as communication not via the network 40. The second communication control unit 520 is a Primary Device Communication Controller (PDCC).

The power transmission control unit 530 executes power transmission control to control the power transmission device 10. Power transmission control is to control power for power transmission, and controls the power conversion unit 12 of the power transmission device 10. Power transmission control unit 530 performs power control to control PFC circuit 210 and inverter 220.

Functional Configuration of Vehicle ECU

Figure 5:
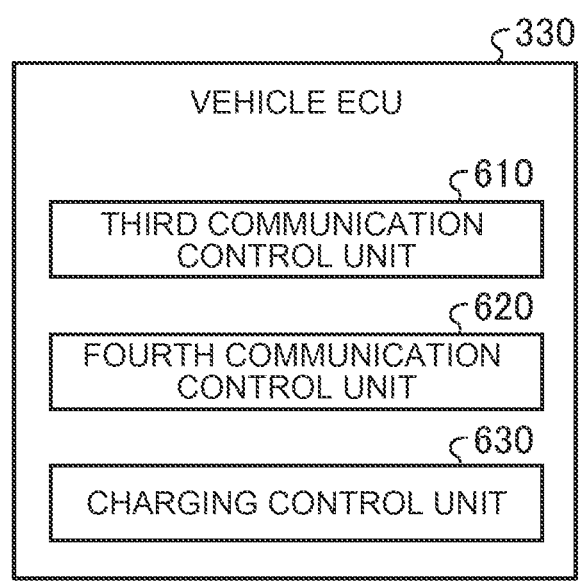
FIG. 5 is a block diagram for explaining the functional configuration of the vehicle ECU.

FIG. 5 is a block diagram showing the functional configuration of vehicle ECU 330. Vehicle ECU 330 includes a third communication control unit 610, a fourth communication control unit 620, and a charging control unit 630.

The third communication control unit 610 executes third communication control to control the third communication device 340. The third communication control controls wide area wireless communication on the vehicle 3 side, and controls communication of the vehicle 3 using the third communication device 340. The third communication control controls communication between the vehicle 3 and the network 40 and also controls communication between the vehicle 3 and the server 30 via the network 40. The third communication control unit 610 is an EV Communication Controller (EVCC).

The fourth communication control unit 620 executes fourth communication control to control the fourth communication device 350. The fourth communication control controls short-range wireless communication on the vehicle 3 side, and controls 30 communication of the vehicle 3 using the fourth communication device 350. The fourth communication control controls communication between the vehicle 3 and the supply device 5 as communication not via the network 40. The fourth communication control unit 620 is a Secondary Device Communication Controller (SDCC).

Charging control unit 630 executes charging control to control power reception device 20 and charging relay 310. Charging control includes power control for controlling received power in secondary device 22 and relay control for controlling the connection state between secondary device 22 and battery 320. Charging control unit 630 performs power control to control rectifier circuit 430. Charging control unit 630 executes relay control to switch the open/closed state of charging relay 310.

In the wireless power transfer system 1 configured as described above, wireless power transmission from the supply device 5 to the vehicle 3 is performed in a state where wireless communication is established between the vehicle 3 and the supply device 5. In a state in which the vehicle 3 and the supply device 5 are paired by wireless communication, power is transmitted from the ground-side primary coil 11 to the vehicle-side secondary coil 21 in a non-contact manner. Then, in the vehicle 3, charging control is performed to supply the electric power received by the secondary coil 21 to the battery 320.

Overview of Power Transmission Process

Next, the power transfer process (D-WPT process) will be explained with reference to FIG. 6. The power transfer process is structured as a chain of multiple activities and is a process derived from states and corresponding transitions.

Figure 6:
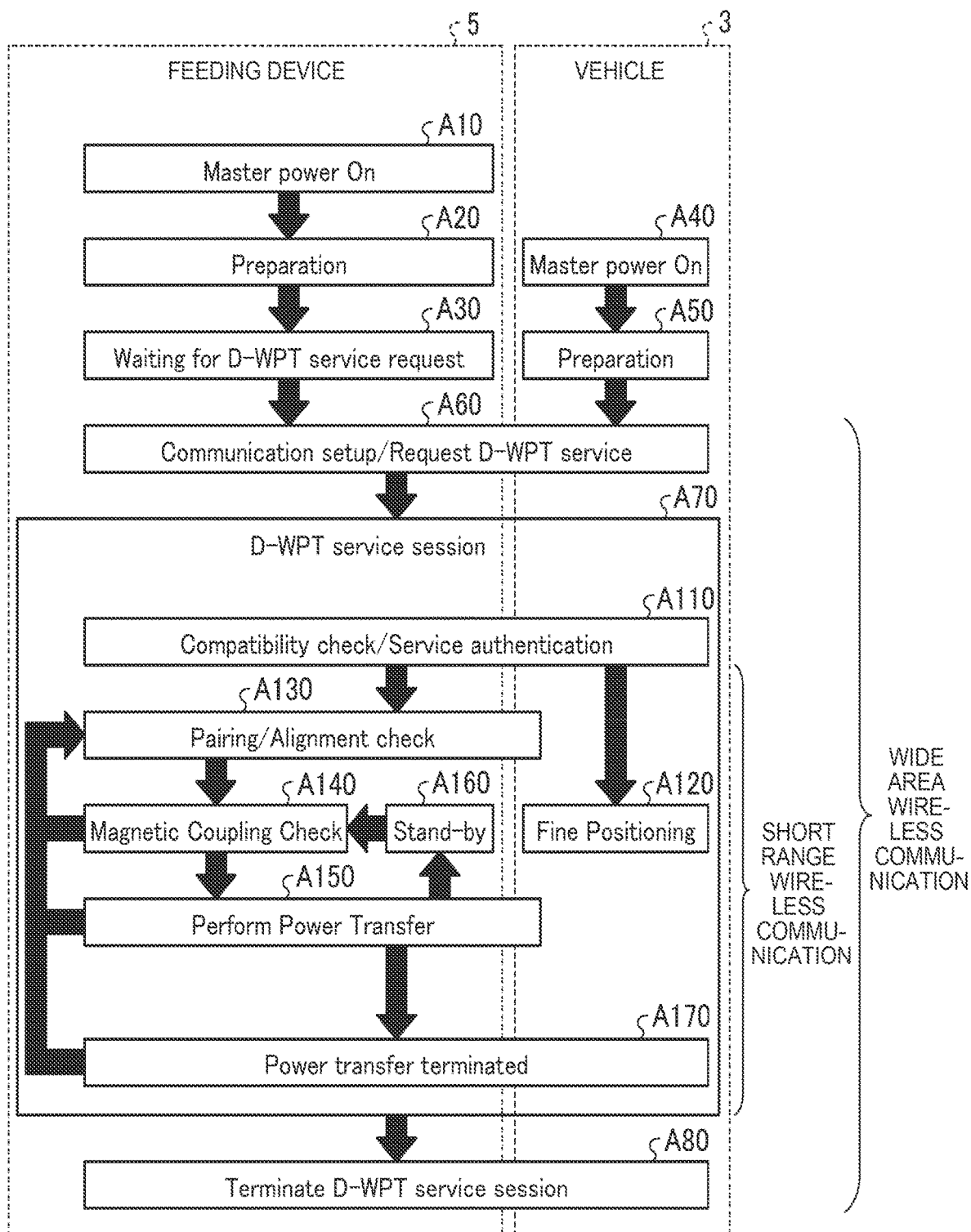
FIG. 6 is a diagram for explaining the power transfer process.

FIG. 6 is a diagram for explaining the power transfer process. In FIG. 6, basic activities are shown to explain the power transfer process. The thick arrows shown in FIG. 6 represent transition lines. The state of the wireless power transfer system 1 in the power transfer process is represented by activities that constitute the power transfer process.

The activities that make up the power transfer process include the power transfer service session (D-WPT service session A70), which is the activity at the stage of power transmission, the activity at the stage before power transmission, and the activity at the stage after power transmission. Further, the activity can be explained by dividing the main body of the operation depending on the presence or absence of communication between the supply device 5 and the vehicle 3. The activities include one that represents the state of only the supply device 5 side without communication, one that represents the state of only the vehicle 3 side without communication, and one that represents the state of both the supply device 5 and vehicle 3 that have communication. It can be divided into As shown in FIG. 6, the activities include Master power On A10, Preparation A20, Waiting for D-WPT service request from vehicle 3 (Waiting for D-WPT service request) A30, Master power On A40, Preparation A50, Communication setup, and It includes Request D-WPT service A60, D-WPT service session A70, and Terminate D-WPT service session A80.

Preparation A20 is the preparation state of the supply device 5. In preparation A20, the supply device 5 performs circuit activation and safety confirmation without communication with the vehicle 3. The supply device 5 transitions to the preparation A20 state when the master power source enters the on state A10. If the supply device 5 activates the circuit and confirms safety in preparation A20, the state of the power transmission process changes to Waiting for D-WPT service request A30 from the vehicle 3. On the other hand, when there is a problem with the supply device 5, the supply device 5 notifies the vehicle 3 of information indicating that the wireless power transfer system 1 cannot be used (unusable notification) through wide area wireless communication. The first communication device 120 transmits a notice of unavailability to the vehicle 3.

Preparation A50 is the preparation state of the vehicle 3. In preparation A50, the vehicle 3 performs circuit activation and safety checks without communication with the supply device 5. When the master power source enters the on state A40, the vehicle 3 transitions to the preparation A50 state. If the vehicle 3 activates the circuit and confirms safety in preparation A50, the state of the power transfer process transitions to Communication setup and Request D-WPT service A60. On the other hand, if there is a problem with vehicle 3, vehicle 3 will not initiate wide area wireless communication and will not proceed with subsequent sequences in the D-WPT process.

Figure 7:
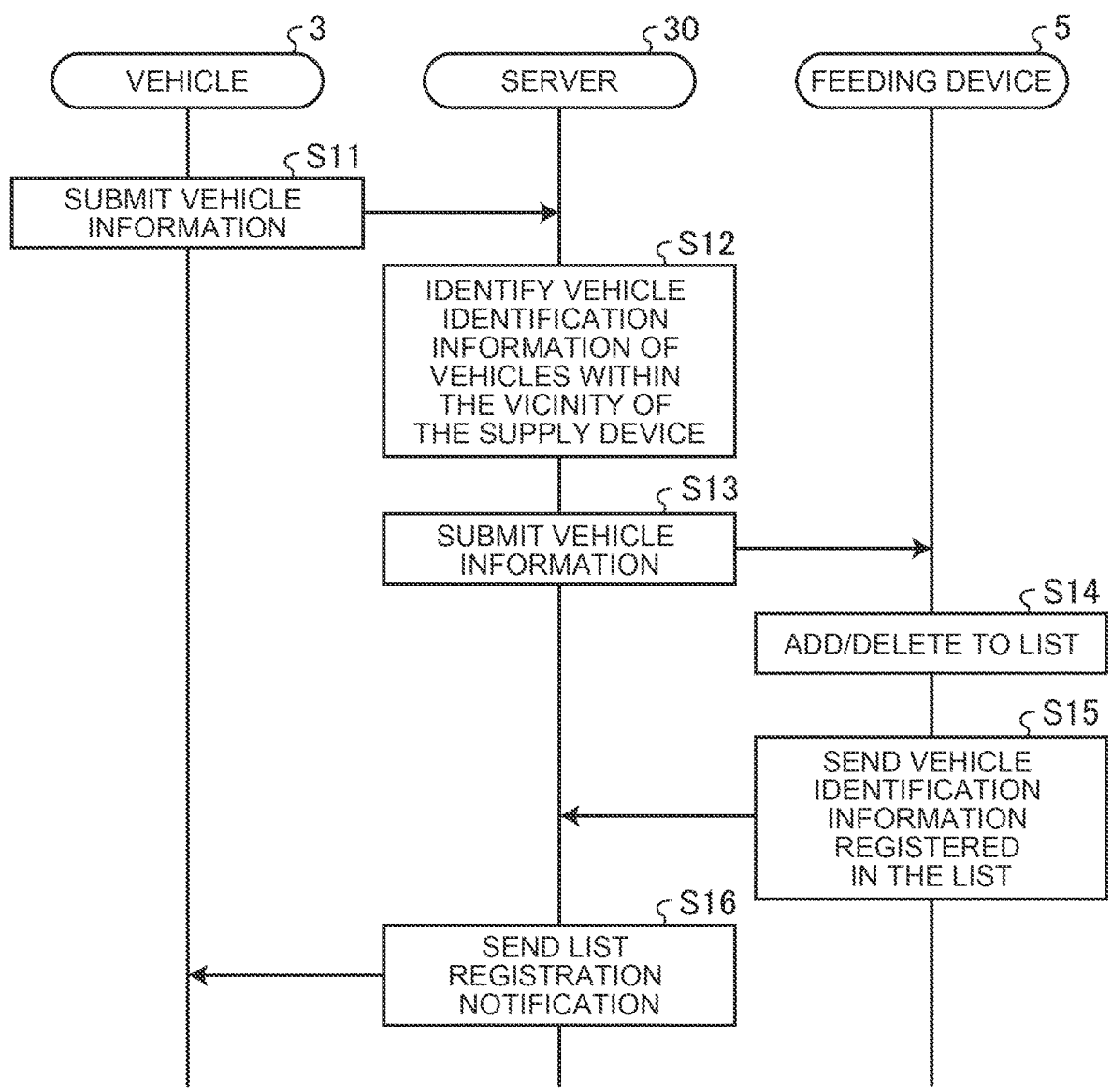
FIG. 7 is a sequence diagram showing a case where communication using wide area wireless communication is carried out between a vehicle and a supply device.

Communication setup and D-WPT service request A60 is initiated by vehicle ECU 330. In request A60 for communication settings and D-WPT service, vehicle ECU 330 starts wide area wireless communication. First, when the vehicle 3 transitions from preparation A50 to communication setup and D-WPT service request A60, the third communication device 340 transmits a D-WPT service request signal. The third communication device 340 performs wireless communication with the first communication device 120 corresponding to the D-WPT lane into which the vehicle 3 is scheduled to enter or has entered. The first communication device 120 to be communicated with is selected based on the relative positional relationship between the current position of the vehicle 3 and the position of the D-WPT lane. On the supply device 5 side, when the first communication device 120 receives the D-WPT service request signal in the state of waiting for a request from the vehicle 3 A30, the state of the power transmission process changes to the state of communication setting and D-WPT service request. Transition to A60. Various information on wide area wireless communication and P2PS communication are linked using vehicle identification information. FIG. 7 shows the processing sequence of this communication setup and D-WPT service request A60.

FIG. 7 is a sequence diagram showing a case where communication using wide area wireless communication is carried out between the vehicle 3 and the supply device 5.

The vehicle 3 transmits vehicle information to the server 30 (S11). In S11, the third communication device 340 of the vehicle 3 transmits vehicle information to the server 30. The vehicle information includes vehicle identification information, various parameters of the power reception device 20, current position information of the vehicle 3, and requested power. Vehicle ECU 330 calculates the required power based on the State of Charge (SOC) of battery 320. In S11, vehicle ECU 330 causes third communication device 340 to transmit vehicle information at predetermined time intervals. The predetermined time is set according to the distance from the current position of the vehicle 3 to the starting point of the WPT lane. The shorter the distance from the vehicle 3 to the starting point of the WPT lane, the shorter the predetermined time interval.

When the server 30 receives the vehicle information from the vehicle 3, it specifies the vehicle identification information of the vehicle 3 located in the vicinity of the supply device 5 based on the current position information of the vehicle 3 included in the vehicle information (S12). In S12, the server 30 identifies the vehicle 3 located within a predetermined vicinity area from the supply device 5 based on the current position information of the vehicle 3 and the position information of the supply device 5. The neighboring area is set to an area within 500 meters, for example.

After identifying the vehicle identification information of the vehicle 3, the server 30 transmits the vehicle information to the supply device 5 (S13). In S13, the transmitting device of the server 30 transmits vehicle information to the supply device 5.

When the supply device 5 receives the vehicle information from the server 30, it registers and deletes the vehicle identification information from the identification information list (S14). In S14, the power transmission ECU 110 registers/deletes the vehicle identification information in the identification information list so that the vehicle identification information linked to the vehicle information is registered in the identification information list without excess or deficiency.

After registering and deleting the vehicle identification information from the identification information list, the supply device 5 transmits the vehicle identification information registered in the identification information list to the server 30 (S15). In S15, the first communication device 120 of the supply device 5 transmits vehicle identification information to the server 30.

Then, upon receiving the vehicle identification information from the supply device 5, the server 30 transmits a list registration notification to the vehicle 3 corresponding to the vehicle identification information registered in the identification information list (S16). In S16, the communication device of the server 30 transmits a list registration notification to the vehicle 3. The list registration notification is a notification indicating that the vehicle identification information is registered in the identification information list, and includes identification information of the supply device 5 and position information of the supply device 5.

Thus, when the vehicle 3 starts wide area wireless communication and both the supply device 5 and the vehicle 3 are in the state of communication setting and D-WPT service request A60, the communication setting by wide area wireless communication is successful. With the success of this communication setup, the state transitions to D-WPT service session A70.

Return to FIG. 6. In the D-WPT service session A70, in a state where a communication connection is established between the supply device 5 and the vehicle 3, power is transmitted from the power transmission side resonance circuit 240 of the supply device 5 to the power reception side resonance circuit 410 of the vehicle 3 in a non-contact manner. The D-WPT service session A70 starts with successful communication setup and ends with the end of communication. When communication ends in the state of D-WPT service session A70, the state changes to Terminate D-WPT service session A80.

In D-WPT service session termination A80, the vehicle 3 terminates wide area wireless communication with the supply device 5. The vehicle 3 and the supply device 5 can receive a trigger for the termination of the D-WPT service session A70. Then, the vehicle ECU 330 prevents the secondary device 22 and the vehicle 3 from starting D-WPT until the third communication device 340 receives the next notification (D-WPT service request signal).

Details of D-WPT Service Session A70

Here, detailed activities of the D-WPT service session A70 will be explained.

The D-WPT service session A70 includes Compatibility check and Service authentication A110, Fine Positioning A120, Pairing and Alignment check A130, Magnetic Coupling Check A140, Perform Power Transfer A150, Stand-by A160, and Power transfer terminated A170.

Compatibility check and service authentication A110 will be described. After successful communication setup, vehicle ECU 330 and power transmission ECU 110 confirm that primary device 13 and secondary device 22 are compatible. The compatibility check is performed on the supply device 5 side based on information associated with vehicle identification information acquired through communication. Check items include the minimum ground clearance of the secondary device 22, the shape type of the secondary device 22, the circuit topology of the secondary device 22, the self-resonant frequency of the secondary device 22, the number of secondary coils 21, and the like.

In the compatibility check and service authentication A110, the vehicle 3 first transmits compatibility information of the power reception device 20 from the third communication device 340 to the supply device 5. The first communication device 120 of the supply device 5 receives the compatibility information of the power reception device 20 from the vehicle 3. The first communication device 120 of the supply device 5 then transmits the compatibility information of the power transmission device 10 to the vehicle 3. The third communication device 340 of the vehicle 3 receives the compatibility information of the power transmission device 10 from the supply device 5.

Elements of compatibility information that the vehicle 3 transmits to the supply device 5 include vehicle identification information, WPT Power Classes, Air Gap Class, WPT Operating Frequencies, WPT frequency adjustment, WPT Type, WPT Circuit Topology, Fine Positioning Method, Pairing Method, Alignment Method, power adjustment function information, and the like.

Elements of compatibility information that supply device 5 sends to vehicle 3 include feeder identification, WPT power class, gap class, WPT drive frequency, WPT frequency adjustment, WPT type, WPT circuit topology, detailed alignment method, It includes pairing method, alignment method, information on presence/absence of power adjustment function, and the like.

Each element name will be explained in detail. In the following, each element of the compatibility information transmitted from the vehicle 3 to the supply device 5 will be described. Descriptions of compatibility information transmitted from the supply device 5 to the vehicle 3 that overlaps with the compatibility information transmitted from the vehicle 3 to the supply device 5 will be omitted.

The gap class is information indicating a gap class from which the secondary device 22 can receive power.

The WPT power class is information indicating a power class in which the secondary device 22 can receive power.

The WPT drive frequency is information indicating the frequency of received power that the secondary device 22 receives.

WPT frequency adjustment is information indicating whether or not the drive frequency can be adjusted.

The WPT type is information indicating the shape type of the secondary device 22 and indicates the coil shape of the secondary coil 21. Examples of the WTP type include circular and solenoid.

The WPT circuit topology is information indicating the connection structure between the secondary coil 21 and the resonant capacitor. WTP circuit topologies include series and parallel.

The detailed alignment method is information indicating by what method the alignment is to be performed.

The pairing method is a method in which the vehicle 3 performs pairing to identify the supply device 5.

The alignment method is a method of confirming the relative positions of the secondary device 22 and the primary device 13 before starting power transmission.

Fine positioning A120 will be described.

Vehicle 3 performs fine positioning A120 prior to pairing and alignment check A130 or in parallel with these activities. When the vehicle ECU 330 determines that the vehicle 3 has approached or entered the area (WPT lane) where the supply device 5 is installed, it begins fine positioning A120.

Vehicle ECU 330 guides vehicle 3 to align primary device 13 and secondary device 22 within a range that establishes sufficient magnetic coupling for wireless power transfer.

Fine positioning A120 is basically performed manually or automatically on the vehicle 3 side. The fine positioning A120 can cooperate with ADAS (Automatic Driving Assistance System).

The fine positioning A120 activity then continues until the vehicle 3 leaves the D-WPT charging site or the state changes to end of communication, and the location data transmitted from the supply device 5 to the vehicle 3 by wide area wireless communication is It can be performed based on alignment information. This end of communication refers to the end of the D-WPT service session A80.

Pairing/Alignment check A130 will be explained. Here, pairing and alignment check will be explained separately.

First, pairing will be explained.

The P2PS interface for short range wireless communication ensures that the primary device 13 and the secondary device 22 are uniquely paired. The process of pairing status is as follows.

First, the vehicle ECU 330 recognizes that the vehicle 3 has approached or entered the D-WPT lane. For example, the vehicle ECU 330 has map information including the D-WPT lane, and compares it with the position information of the own vehicle obtained by the GPS receiver 360 to recognize the approach or entry based on the straight line distance etc. do. The vehicle 3 transmits to the server 30 which D-WPT lane it has approached via wide area wireless communication. In short, the third communication device 340 notifies the cloud of a signal indicating that the vehicle 3 has approached any D-WPT lane. Further, if the vehicle ECU 330 recognizes the approach or entry of the vehicle 3 into the D-WPT lane, the fourth communication device 350 will, at regular intervals, for pairing the primary device 13 and the secondary device 22. Start transmitting the modulated signal.

Furthermore, the supply device 5 may recognize that the vehicle 3 has approached or entered the D-WPT lane using information acquired from the server 30 through wide area wireless communication. The server 30 allocates the vehicle identification information of the vehicle 3 approaching on each D-WPT lane to the supply device 5 corresponding to that lane. Since the supply device 5 only needs to refer to the vehicle identification information whose number has been narrowed down by the server 30, the authentication process can be completed in a short time. When the supply device 5 recognizes that the vehicle 3 is approaching the D-WPT lane, the second communication device 130 goes into standby mode. In standby mode, it waits to receive a modulated signal from the fourth communication device 350 of the vehicle 3. This modulated signal includes vehicle identification information.

When the second communication device 130 receives the modulated signal from the vehicle 3, the supply device 5 transmits the vehicle identification information received through short-range wireless communication and wide-area wireless communication with the plurality of vehicles 3 approaching the D-WPT lane. The vehicle identification information in the identification information list obtained as a result is compared. By means of this comparison the supply device 5 identifies the vehicle 3.

When the vehicle ECU 330 recognizes that the vehicle 3 is out of the D-WPT lane, it stops transmitting the modulated signal from the fourth communication device 350. Vehicle ECU 330 can determine whether the D-WPT lane has been passed based on the map information and the position information of the host vehicle.

When the supply device 5 determines that the vehicle 3 is not traveling in the D-WPT lane or determines that the vehicle 3 is not approaching the D-WPT lane, the modulated signal from the fourth communication device 350 stop waiting for Pairing is performed to the primary device 13 until the vehicle 3 exits the D-WPT charging site or the state changes to end of communication. When pairing is completed, the state transitions to Alignment check.

Next, the alignment check will be described.

The purpose of the alignment check is to ensure that the lateral distance between the primary device 13 and the secondary device 22 is within an acceptable range. The alignment check is performed using short range wireless communication (P2PS).

Alignment checks continue to be performed based on P2PS until the vehicle 3 leaves the D-WPT charging site or the state changes to End of Communication. The results of the alignment check can be transmitted from the first communication device 120 to the third communication device 340 via wide area wireless communication.

The magnetic coupling check A140 will be explained.

In magnetic coupling check A140, the supply device 5 checks the magnetic coupling state and confirms that the secondary device 22 is within an acceptable range. When the magnetic coupling check A140 is completed, the state transitions to perform power transfer A150.

Perform power transfer A150 of power transmission will be explained. In this state, the supply device 5 performs power transmission to the power reception device 20. The power transmission device 10 and the power reception device 20 need to have the ability to control the transmitted power (transmitted power and received power) for the usefulness of the MF-D-WPT and the protection of the power reception device 20 and the battery 320. Greater power transfer helps power reception device 20 travel longer distances without static wireless charging and conductive charging. However, the capacity of the battery 320 varies depending on the model of the vehicle 3, and the demand for driving power may fluctuate rapidly. An example of this sudden change is sudden regenerative braking. When the regenerative braking is performed while traveling in the D-WPT lane, the regenerative braking is given priority, so that the electric power received from the power reception device 20 is supplied to the battery 320 in addition to the regenerative electric power. In this case, in order to protect the battery 320 from overcharging, the power reception device 20 needs to adjust the transmitted power.

Despite the necessity of power control, communication is not newly started between the supply device 5 and the power reception device 20 in this state. This is because communication can impair response and accuracy in power control due to its instability and latency. Therefore, the supply device 5 and the power reception device 20 perform power transmission and control based on known information up to this state.

The supply device 5 increases the transmission power for the magnetic coupling check in advance in response to the power request transmitted from the third communication device 340 using wide area wireless communication. The supply device 5 attempts to keep the current and voltage fluctuations within its bounds while maximizing the power transferred during the transition.

The power reception device 20 basically receives the transmitted power from the power transmission device 10 without any control. However, the power reception device 20 starts control when the transmitted power exceeds or is about to exceed the limit, such as the rated power of the battery 320, which varies depending on the state of charge and the power demand for driving the vehicle 3. Further, power control in the vehicle ECU 330 is also required to cope with malfunctions in wide area wireless communication. This malfunction leads to a contradiction between the power control target in the primary device 13 and the request from the third communication device 340, and sudden failure of the power reception device 20 and the battery 320 during power transmission. The power reception device 20 controls the transmitted power based on the power request rate notified by the first communication device 120.

Power requirements are determined based on compatibility check information such as vehicle 3 and primary device 13 WPT circuit topology, geometry, ground clearance, EMC (electromagnetic compatibility). The magnetic field varies depending on these specifications, and it is necessary to transmit power within a range that satisfies EMC.

Power control in power transmission ECU 110 and power reception device 20 may interfere with each other. In particular, it may interfere if the supply device 5 attempts to achieve a power demand greater than the current power limit at the power reception device 20 via wide area wireless communication. An example of this is rapid regeneration control using a relatively small battery 320 in the vehicle 3. If possible, it is desirable that the supply device 5 be able to detect mismatches between power control goals and limits and adjust the power transfer to resolve the mismatches.

If the secondary device 22 is still on top of the primary device 13, for example, if foreign object detection device 140 detects a foreign object on the primary device 13, or if the magnetic coupling is low due to misalignment of the secondary device 22. If power transfer is interrupted for a short period of time, the state transitions to Stand-by A160. Note that if the vehicle 3 is provided with a foreign object detection device, the foreign object may be detected on the vehicle 3 side.

Once the secondary device 22 passes over the primary device 13, the state transitions to Power transfer terminated A170. In this case, less power is transferred because the magnetic coupling between the two devices is weaker. Since the supply device 5 can detect that the magnetic coupling has weakened by monitoring the transmitted power, the supply device 5 basically determines the state transition to power transfer terminated A170, and then the power Start dropping voltage to stop transmission.

Standby A160 will be explained.

In this state the power transfer is briefly interrupted for some reason and when the D-WPT is ready in both the vehicle 3 and the supply device 5 the state returns to perform power transfer A150. If there is a possibility of interrupting power transfer, the state is perform power transfer A150.

Power transfer terminated A170 will be explained.

In this state, the supply device 5 reduces the transmitted power to zero and retains or uploads power transmission result data such as total transmitted power, power transmission efficiency, and failure history. Each data is tagged with vehicle identification information. Finally, the supply device 5 deletes the vehicle identification information of the vehicle 3 that has passed through the D-WPT lane. This allows the supply device 5 to be ready for subsequent pairing and power transfer to another vehicle. FIG. 9 shows the processing sequence of the power transfer terminated A170.

Figure 8:
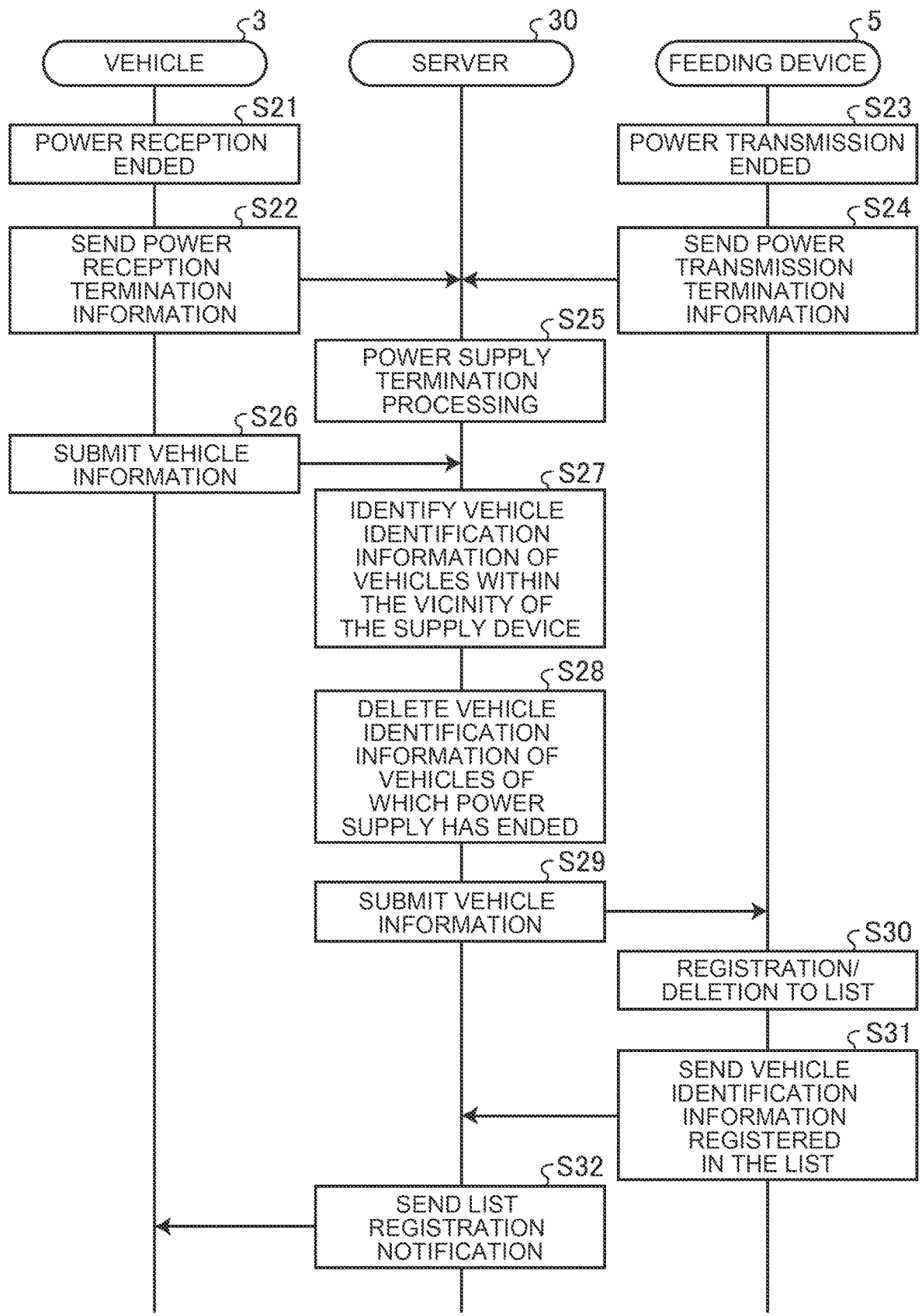
FIG. 8 is a sequence diagram showing the operation after the power supply from the supply device to the vehicle while running is completed.

FIG. 8 is a sequence diagram showing the operation after the supply of power from the supply device 5 to the vehicle 3 while running is completed.

When the power reception device 20 of the vehicle 3 finishes receiving power from the supply device 5 (S21), the vehicle 3 transmits power reception end information to the server 30 (S22). In S22, power reception end information is transmitted from the third communication device 340 of the vehicle 3. The power reception end information includes, as information related to power reception from the supply device 5, vehicle identification information of the vehicle 3, power received from the supply device 5, power reception efficiency, and an abnormality detection result, for example.

The supply device 5 ends power transmission to the vehicle 3 when the process of S21 is performed (S23). As for the processing of S21 and the processing of S23. It may or may not be performed at the same time. When the process of S23 is performed, the supply device 5 transmits power transmission end information to the server 30 (S24). In S24, power transmission end information is transmitted from the first communication device 120 of the supply device 5.

When receiving the power reception end information from the vehicle 3 and the power transmission end information from the supply device 5, the server 30 performs power supply end processing for ending power supply from the supply device 5 to the vehicle 3 (S25). In the power supply termination process, based on the power reception termination information and the power transmission termination information, a process of calculating the amount of power supplied from the supply device 5 to the vehicle 3 and a process of charging the user of the vehicle 3 based on the calculated amount of supplied power are performed. It will be done.

Furthermore, the vehicle 3 transmits vehicle information to the server 30 regardless of the power supply termination process (S26). In S26, vehicle information is transmitted from the third communication device 340 of the vehicle 3.

When the server 30 receives the vehicle information from the vehicle 3 after performing the power supply termination process, the server 30 specifies the vehicle identification information of the vehicle 3 located within the vicinity of each supply device 5 based on the vehicle information (S27).

Then, if the power supply termination process for a certain vehicle 3 has already been performed in a certain supply device 5, the server 30 deletes the vehicle identification information of the vehicle 3 for which the power supply termination process has already been performed, from the vehicle identification information of the vehicle 3 in the vicinity area of this supply device 5 specified in the process of S27 (S28).

After that, the server 30 transmits to each supply device the vehicle information linked to the vehicle identification information that has not been deleted in the process of S28, among the vehicle identification information of the vehicle 3 identified as being located in the vicinity area of each supply device 5. 5 (S29).

After the vehicle information is transmitted to each supply device 5 in the process of S29, when the supply device 5 receives the vehicle information from the server 30, the supply device 5 registers/deletes the vehicle identification information in the identification information list. (S30). The processing of S30 is the same as the processing of S14 in FIG. 8. After that, the supply device 5 transmits the vehicle identification information registered in the identification information list to the server 30 (S31). The processing of S31 is the same as the processing of S15 in FIG. 8.

Then, upon receiving the vehicle identification information from the supply device 5, the server 30 transmits a list registration notification to the vehicle 3 corresponding to the vehicle identification information registered in the identification information list (S32). The processing of S32 is the same as the processing of S16 in FIG. 8.

As a result, when the processing shown in FIG. 8 is performed, the identification information list indicates that each supply device 5 is located in the vicinity area, that the supply device 5 has not finished supplying power, and that the vehicle identification information is registered for the vehicle 3 for which no identification information erasure request has been made. Then, when the vehicle identification information of the vehicle 3 is registered in the identification information list of any of the pieces of the supply equipment 2, the vehicle 3 receives a list registration notification. Therefore, the vehicle ECU 330 can determine that the own vehicle is registered in any of the supply devices 5 by receiving the list registration notification. When the vehicle 3 moves out of the vicinity of the supply device 5, the vehicle identification information of the vehicle 3 is deleted from the identification information list of the supply device 5.

Return to FIG. 6. Further, at the power transfer terminated A170, the power reception device 20 does not need to do anything to reduce the transmitted power to zero. The P2PS interface is kept active when the vehicle 3 is in the D-WPT lane, and the state of the power reception device 20 automatically transitions to pairing for power transmission from the next primary device 13. The state transitions from Power transfer terminated A170 to Pairing and Alignment Check A130 as the transition line shown in FIG. 6. As shown in FIG. 6, when a predetermined transition condition is satisfied, the magnetic coupling check A140 is possible to transition to the pairing and alignment check A130, and the perform power transfer A150 transitions to the pairing and alignment check A130. Pairing may be performed for each of the plurality of primary coils 11 individually, or may be performed at a representative point by bundling the plurality of primary coils 11.

In the D-WPT service session A70, when there is no D-WPT request from the vehicle ECU 330, or a series of states from the communication setting and D-WPT service request A60 to the power transfer terminated A170 are prohibited. In this case, the process transitions to D-WPT service session end A80, and the wide area wireless communication between the first communication device 120 and the third communication device 340 is stopped. For example, the D-WPT shuts down when the state of charge in battery 320 is too high or when powered device 20 is too hot for continuous power transfer. Such unnecessary D-WPTs can be disabled by simply deactivating the P2PS interface. However, by stopping the wide area wireless communication, the power transmission ECU 110 can release the memory occupied for the vehicle 3 without requiring the D-WPT by terminating the established wide area wireless communication.

Furthermore, the D-WPT service session A70 is not limited to transitions like the transition line shown in FIG. 6. When the D-WPT service session A70 completes the activities after the pairing and alignment check A130, if the conditions are met for the power transfer process to remain in the D-WPT service session A70, the state does not transition to end the D-WPT service session A80, but transitions to compatibility check and service authentication A110. For example, if a predetermined transition condition is met in state Magnetic Coupling Check A140, the state can transition to Compatibility Check and Service Authentication A110.

Here, a part of the processing in the perform power transfer A150 will be described.

FIG. 9 is a flowchart outlining some of the processes executed by the vehicle 3 in the perform power transfer A150.

As shown in FIG. 9, first, the vehicle ECU 330 determines whether the vehicle 3 is being powered while running (S41). If the vehicle ECU 330 determines that the vehicle 3 is being powered while running (S41: Yes), the vehicle 3 moves to S42. On the other hand, if the vehicle ECU 330 determines that the vehicle 3 is not being supplied with power while running (S41: No), the vehicle 3 ends this process and moves to power transfer terminated A170.

Next, vehicle ECU 330 determines whether the current environment in which vehicle 3 is traveling is nighttime based on the detection result input from brightness sensor 370 (S42). If the vehicle ECU 330 determines that the current environment in which the vehicle 3 is traveling is nighttime (S42: Yes), the vehicle 3 moves to S43. On the other hand, if the vehicle ECU 330 determines that the current environment in which the vehicle 3 is traveling is not at night (S42: No), the vehicle 3 ends this process and moves to power transfer terminated A170.

After that, vehicle ECU 330 determines whether or not the power transmission efficiency from supply device 5 to power reception device 20 has decreased based on the power received by power reception device 20 (S43). If the vehicle ECU 330 determines that the power transmission efficiency from the supply device 5 to the power reception device 20 is decreasing (S43: Yes), the vehicle 3 moves to S44. On the other hand, if the vehicle ECU 330 determines that the efficiency of power transmission from the supply device 5 to the power reception device 20 has not decreased (S43: No), the vehicle 3 ends this process and performs power transmission. The process moves to power transfer terminated A170.

Subsequently, the vehicle ECU 330 determines the distance between the primary device 13 and the secondary device 22 based on the lateral distance between the primary device 13 and the secondary device 22 via short-range wireless communication (P2PS). It is determined whether a positional shift has occurred in the lateral direction of the vehicle 3 due to the lateral distance being outside the allowable range (S44). If the vehicle ECU 330 determines that the lateral distance between the primary device 13 and the secondary device 22 is outside the allowable range, and that a lateral positional shift of the vehicle 3 has occurred (S44: Yes), the vehicle 3 moves to S45. On the other hand, the vehicle ECU 330 determines that the lateral distance between the primary device 13 and the secondary device 22 is outside the permissible range, and that no misalignment has occurred in the lateral direction of the vehicle 3. If it is determined (S44: No), the vehicle 3 ends this process and moves to power transfer terminated A170.

After that, vehicle ECU 330 determines whether AFS 380 is in the off state (S45). When vehicle ECU 330 determines that AFS 380 is in the off state (S45: Yes), the process moves to S46. On the other hand, if the vehicle ECU 330 determines that the AFS 380 is not in the off state (S45: No), the vehicle 3 ends this process and moves to the power transfer terminated A170.

Subsequently, vehicle ECU 330 switches AFS 380 to the on state (S46).

Thereafter, in response to the steering operation of the vehicle 3, the vehicle ECU 330 sets an optical axis in the steering direction of the vehicle 3 and directs the light in the direction of travel of the vehicle 3 near the center of the power supply lane where power transmission efficiency is increased. The irradiation position by the AFS 380 is controlled by irradiating (S47). Here, the power supply lane is the road 4 on which the primary device 13 of the supply device 5 is arranged. This allows the driver to manually correct the lateral deviation of the power feeding lane by steering the vehicle 3 toward the light emitted by the AFS 380. After S47, the vehicle 3 ends this process and moves to power transfer terminated A170.

According to the embodiment described above, when the power transmission efficiency decreases as the vehicle 3 deviates laterally from the power supply lane where the supply device 5 is arranged, and the AFS 380 is in the off state at night, the vehicle ECU 330 Switch the state of AFS 380 to ON state. This causes the driver to steer toward the light emitted by the AFS 380. As a result, the vehicle 3 can improve the power transmission efficiency even when the power transmission efficiency decreases when the vehicle 3 deviates from the power feeding lane at night.

Further, according to the embodiment, the vehicle ECU 330 provides an optical axis in the steering direction of the vehicle 3 in response to the steering operation of the vehicle 3, and performs irradiation of light in the traveling direction of the vehicle 3, that is, in the traveling direction near the center of the power feeding lane where power transmission efficiency is increased. This allows the driver to steer the vehicle 3 toward the light emitted by the AFS 380, allowing him to manually correct the lateral deviation of the power supply lane, which will prevent power transmission efficiency from decreasing. However, power transmission efficiency can be improved.

Further, in the wireless power transfer system according to the embodiment, the above-described "power reception device" can be read as "means" or "circuit". For example, the power reception device can be read as power receiving means or a power receiving circuit.

Further, the program executed by the wireless power transfer system according to the embodiment is file data in an installable or executable format such as a CD-ROM, a flexible disk (FD), a CD-R, a Digital Versatile Disk (DVD), The information is provided recorded on a computer-readable recording medium such as a USB medium or a flash memory.

In addition, in the description of the flowchart in this specification, expressions such as "first", "after", and "following" are used to clearly indicate the anteroposterior relationship of the processing between steps. The order of processing required to do so is not uniquely determined by those representations. That is, the order of processing in the flowchart charts described herein may be changed within a consistent range.

Further effects and modifications can be easily derived by those skilled in the art. The broader aspects of the disclosure are not limited to the specific details and representative embodiments shown and described above. Accordingly, various changes may be made without departing from the spirit or scope of the general inventive concept defined by the appended claims and equivalents thereof.

As described above, some of the embodiments of the present application have been described in detail with reference to the drawings. It is possible to carry out the present disclosure in other forms with modifications and improvements.

What is claimed is:

1. A control device that controls a vehicle capable of receiving power from a primary coil of a supply device using a secondary coil of a power reception device in a non-contact manner while traveling in a power supply lane, the control device comprising a processor configured to:
   determine whether a power transmission efficiency decreases due to a lateral deviation of the vehicle from the power supply lane at night;
   activate an irradiation unit, the irradiation unit being configured to provide an optical axis in a steering direction and emit light in a traveling direction of the vehicle in response to a steering operation; and
   control an irradiation position of the irradiation unit to irradiate an area where the power transmission efficiency is increased in the power supply lane, in response to a determination that the power transmission efficiency decreases due to the lateral deviation.

2. The control device according to claim 1, wherein
   the processor is further configured to measure a lateral distance between a primary device in the supply device and a secondary device in the power reception device using short-range wireless communication with the supply device, and
   a determination of whether the power transmission efficiency decreases due to the lateral deviation is made based on the measured lateral distance.

3. The control device according to claim 2, wherein the determination that the power transmission efficiency decreases due to the lateral deviation is made in a case where the measured lateral distance is outside a predetermined range.

4. The control device according to claim 1, wherein the irradiation unit is an adaptive front-lighting system (AFS).

5. The control device according to claim 1, wherein the irradiation position is changed toward a center of the power supply lane to irradiate the area where the power transmission efficiency is increased in the power supply lane.

6. The control device according to claim 2, wherein the irradiation position is changed toward a center of the power supply lane to irradiate the area where the power transmission efficiency is increased in the power supply lane.

7. The control device according to claim 3, wherein the irradiation position is changed toward a center of the power supply lane to irradiate the area where the power transmission efficiency is increased in the power supply lane.

8. A control device mounted in a vehicle, the control device comprising a processor configured to:
   determine whether power transmission is carried out wirelessly from a primary coil of a power supply lane to a secondary coil of the vehicle traveling on the power supply lane, the primary coil being included in a primary device of a power supplier embedded in the power supply lane, and the secondary coil being included in a secondary device of a power receiver mounted in the vehicle;
   detect brightness of a current environment where the vehicle is traveling using a sensor;
   determine whether the current environment is nighttime based on the detected brightness in response to a determination that the power transmission is carried out;
   determine whether an efficiency of the power transmission decreases in response to a determination that the current environment is nighttime;
   acquire a lateral distance between the primary device and the secondary device using short-range wireless communication between the power supplier and the power receiver;
   determine whether the lateral distance between the primary device and the secondary device falls within a predetermined range in response to a determination that the efficiency of power transmission decreases, the lateral distance within the predetermined range ensuring that a strength of magnetic coupling between the primary device and the secondary device remains above a predetermined value;
   determine whether an adaptive front-light system (AFS) is in an off-state in response to a determination that the lateral distance between the primary device and the secondary device is longer than the predetermined value, the AFS including headlights and being configured to automatically adjust a range of illumination and an area of light distribution under control of the processor; and
   activate the AFS in response to a determination that the AFS is in the off-state and subsequently control the range of illumination and the area of light distribution of the AFS to irradiate a region of the power supply lane in a traveling direction of the vehicle where the strength of magnetic coupling is increased.

9. The control device according to claim 8, wherein the area of light distribution is changed toward a center of the power supply lane to irradiate the region where the strength of magnetic coupling is increased.

* * * * *